Patented Nov. 4, 1930

1,780,539

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PROCESS OF TREATING FIBER OF NONCONIFEROUS ORIGIN

No Drawing.    Application filed March 11, 1927.   Serial No. 174,718.

This invention relates to a treatment of papermaking fiber of non-coniferous origin, and has for its object to modify the characteristics of such fiber to render it applicable to certain uses for which untreated fiber from such sources is material less suitable.

Fiber of non-coniferous origin, such as that liberated from such woods as beech, birch, maple and poplar, or from grasses such as bamboo and bagasse, yields paper of good Mullen strength, but which is brittle and hence low in tear resistance. This is particularly true when the fiber is liberated from the raw, non-coniferous cellulosic material, from birch or poplar, for example, by the sulphite process of digestion. The brittleness and low tear resistance of paper prepared from such fiber is traceable to its short average fiber length and the high content of pentosan and other non-alpha cellulose constituent therein. Such high non-alpha cellulose constituent content also is responsible for the poor quality of rayon, nitrocellulose, cellulose acetate, and other derivatives preparable therefrom.

I have found that if fiber of such origin, and more particularly fiber which has been liberated by the sulphite process of digestion, is treated for a sufficient period under suitable conditions in a strong solution of suitable alkaline compound, e. g., a caustic soda solution, the softness and tear resistance of such fiber is materially increased and sufficient non-alpha cellulose constituent extracted therefrom to render it suitable for use as a raw material in the manufacture of rayon and other cellulose derivatives.

In carrying out the process, one may adopt a procedure substantially as follows: Fiber liberated from birch, for example, by the sulphite process of digestion may be digested with agitation, as, say, a 10% suspension in a solution of caustic soda of from 4% to 10% concentration, at temperatures preferably below 70° C. Under such non-mercerizing conditions, the papermaking characteristics of the fiber are preserved. The fiber, which initially has a pentosan content of 7% to 12%, is treated until such content is reduced to about from 2% to 5%, such treatment requiring about one hour. If a fiber of high refinement for conversion into cellulose derivatives is desired, the time of such treatment may be prolonged or the alkali concentration of treating liquor increased to lower the pentosan content to, say, about 1.5. The treated fiber is then washed free of treating solution, the washed fiber yield amounting to from 80% to 85% of the initial untreated fiber, depending upon the specific conditions maintained in the treatment and the characteristics of the initial fiber. As a result of the extraction of a considerable percentage of non-alpha cellulose constituent therefrom, the treated fiber is much softer, possesses materially higher tear resistance, and is better suitable for use as a raw material in the preparation of cellulose derivatives than the untreated fiber. The treated fiber has physical characteristics comparable to those of fiber derived from the same wood by the soda process of digestion, but possesses the advantage thereover that it is materially more refined or higher in alpha cellulose content. Such treated fiber is suitable for use in the manufacture of soft book and magazine papers of fairly good tear resistance, wherein fiber of long average length is not a prerequisite, and also for the preparation of cellulose derivatives.

The color of the treated fiber may be improved by pre-treatment with a relatively dilute solution of a lignin-reactive reagent, such, for example, as a chlorine or bleach solution. This may also be accomplished by using bleach or like chemical simultaneously with the caustic soda solution. Such pre-treatment or simultaneous treatment with a lignin-reactive reagent may be especially desirable when the fiber is undercooked in sulphite digestion, such undercooking leaving a higher percentage of ligneous material than when the cooking is complete. The alkali-treated fiber may be improved in color by a bleaching treatment preferably under conditions to preserve the fiber characteristics previously attained. This may be accomplished by bleaching the fiber in a bleach liquor maintained distinctly alkaline throughout the bleaching operation as disclosed and claimed in application for patent Serial No. 716,153, filed May 27, 1924 by Milton O. Schur and myself.

The conditions of alkaline treatment and the chemicals employed therein may be varied. Thus, a solution of sodium sulphide, or of sodium sulphide and caustic soda such as used in the kraft process of digestion may be employed as the treating solution. In any case, however, it is essential that the alkaline solution be sufficiently strong or concentrated to effect the removal of sufficient non-alpha cellulose constituent from the fiber to soften it materially and increase its tear resistance, but the concentration must not reach or exceed the concentration at which mercerization or injury to the papermaking characteristics of the fiber occurs, unless it is desired to utilize the pulp for the preparation of cellulose derivatives, in which case mercerization may be desirable. The limit of concentration which may be employed varies with the temperature of treatment. The lower the temperature, the lower the caustic soda concentration which must be maintained to avoid mercerization and injury of the fiber. Inasmuch as sodium sulphide does not effect a mercerization of the pulp, it may be used at higher concentration, either alone or together with the caustic soda, but where sodium sulphide is employed, bleach or similar oxidizing chemical cannot be employed simultaneously therewith.

The present invention may be practised with especial advantage in a mill equipped with apparatus for sulphite digestion but not for soda digestion, and makes possible the production of fiber which not only is suitable for uses for which soda fiber is found suitable, but also in the preparation of cellulose derivatives.

Having thus described the nature of this invention, it is obvious that it is susceptible of various changes and modifications without departing from its spirit or scope as defined by the appended claims.

What I claim is:

1. A step which comprises digesting previously liberated wood fiber of non-coniferous origin, at about room temperature in a solution of alkaline compounds.

2. A step which comprises digesting previously liberated sulphite wood fiber of non-coniferous origin, at about room temperature in a solution of alkaline sodium compound.

3. A step which comprises digesting sulphite fiber of non-coniferous origin, at about room temperature in a solution of caustic soda.

4. A process which comprises pretreating sulphite fiber of non-coniferous origin with a lignin-reactive agent, and then digesting the pretreated fiber at about room temperature in a solution of alkaline compounds.

5. A step which comprises digesting sulphite fiber of non-coniferous origin, at about room temperature in a solution of alkaline compounds containing a lignin-reactive agent.

6. A process which comprises digesting sulphite fiber of non-coniferous origin, at about room temperature in a solution of caustic soda, and then washing the digested fiber free of alkaline solution.

7. A process which comprises digesting chemical fiber of non-coniferous origin, at about room temperature in a solution of caustic soda, washing the digested fiber free of alkaline solution, and bleaching the washed fiber.

8. A process which comprises digesting sulphite fiber of non-coniferous origin, at about room temperature in a solution of alkaline compounds, and then bleaching such fiber.

9. A process which comprises digesting sulphite fiber of non-coniferous origin in a solution of alkaline compounds, and then bleaching such pulp in a bleach liquor maintained distinctly alkaline throughout the bleaching operation.

10. A process which comprises treating sulphite fiber of non-coniferous origin with a lignin-reactive reagent, digesting such treated pulp at about room temperature in a solution of alkaline compounds, and then bleaching such pulp in a bleach liquor maintained distinctly alkaline throughout the bleaching operation.

11. A process which comprises digesting raw cellulosic material of non-coniferous origin in an acid sulphite liquor to effect a liberation of fiber, and then digesting the liberated fiber in a solution of alkaline compounds at about room temperature and under atmospheric pressure.

In testimony whereof I have affixed my signature.

GEORGE A. RICHTER.